Nov. 18, 1947.                 R. L. TUVE ET AL                    2,430,895
                           CONTINUOUS WATER ANALYZER
                         Filed Dec. 8, 1942        3 Sheets-Sheet 2
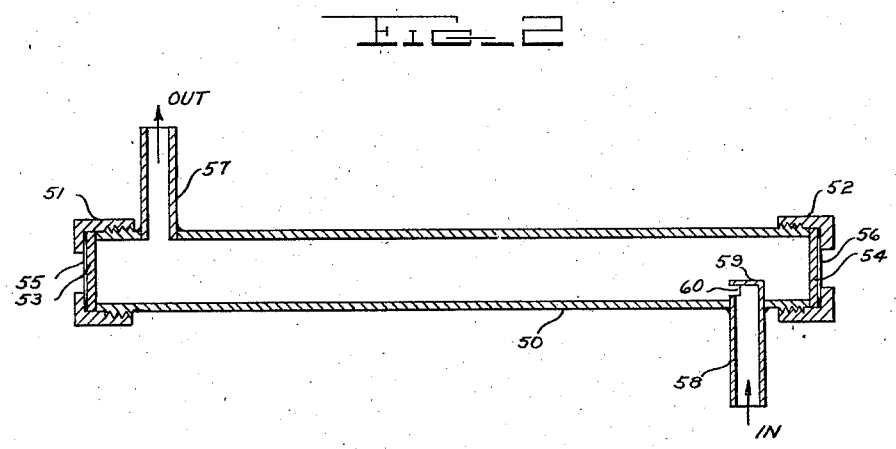
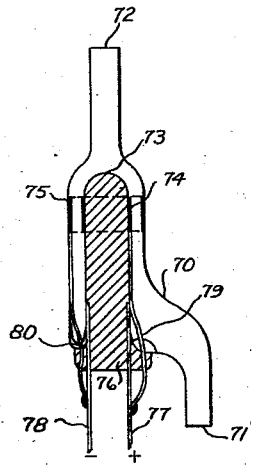
Inventors
RICHARD L. TUVE
JOSEPH C. WHITE
ELMER L. LUKE

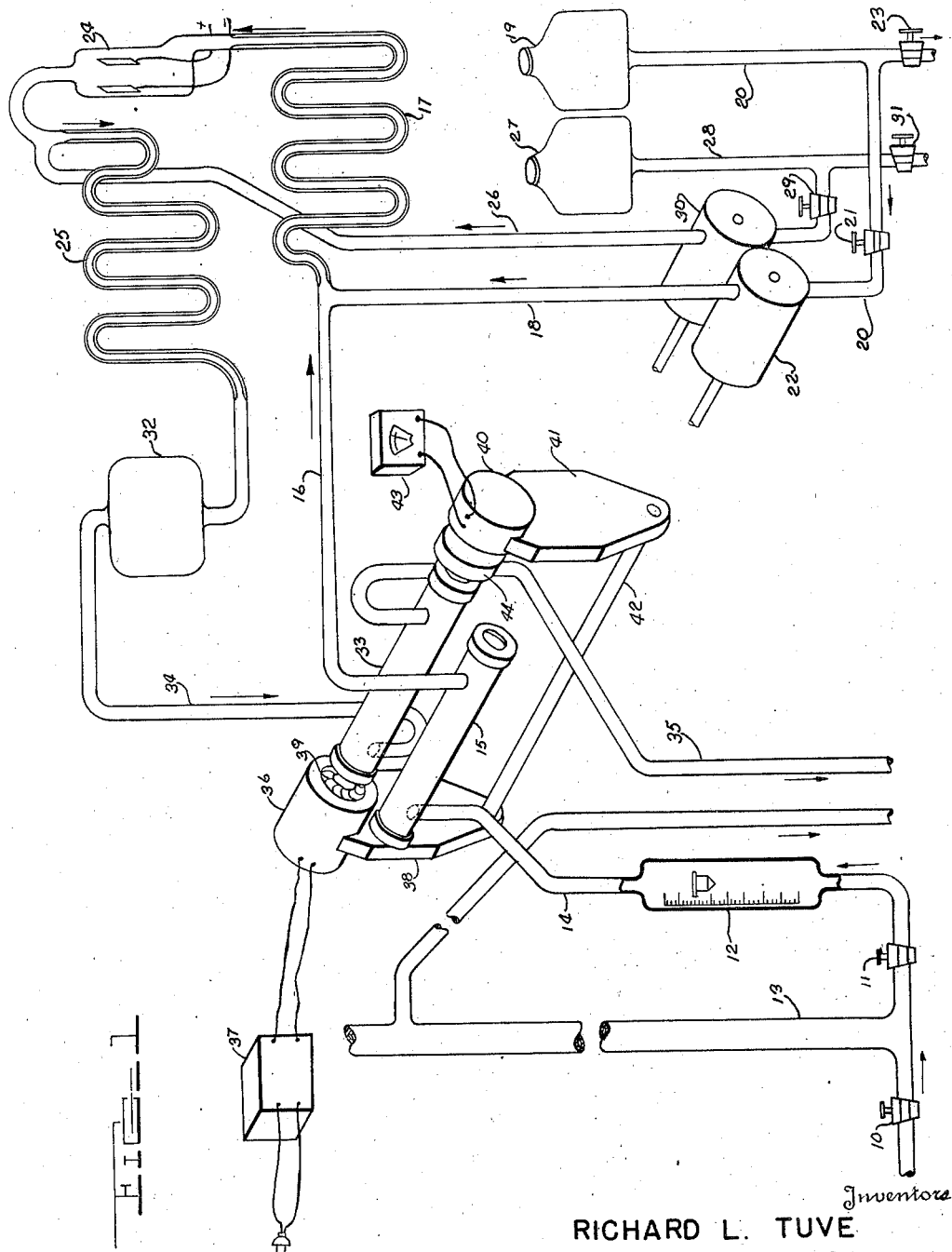

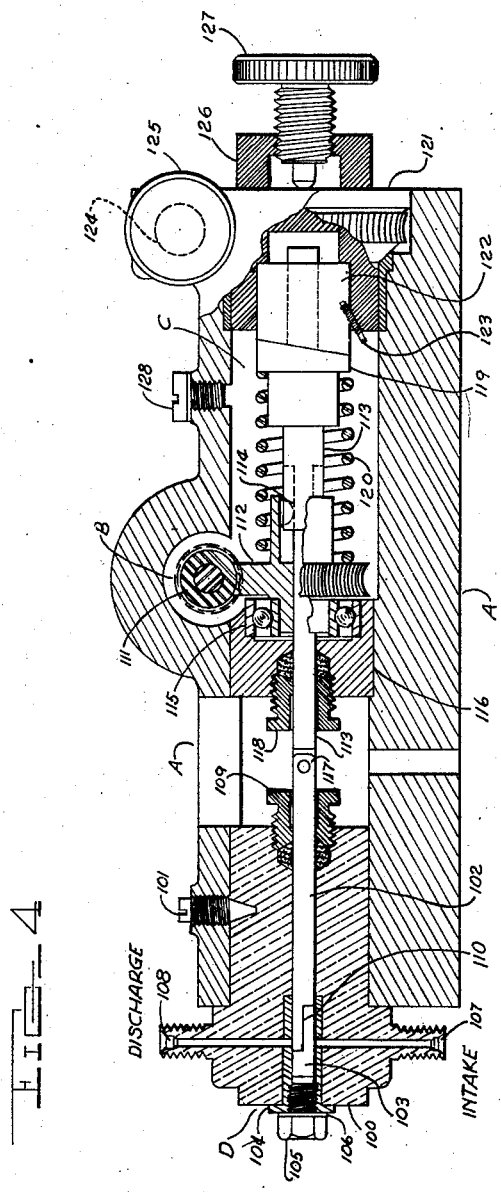

Patented Nov. 18, 1947

2,430,895

UNITED STATES PATENT OFFICE 2,430,895

CONTINUOUS WATER ANALYZER

Richard L. Tuve, Silver Spring, and Joseph C. White, University Park, Md., and Elmer L. Luke, Washington, D. C.

Application December 8, 1942, Serial No. 468,250

1 Claim. (Cl. 23—255)

(Granted under the act of March 3, 1883, as amended April 30, 1928; 370 O. G. 757)

This invention relates to methods for the continuous analysis of water, and to improved apparatus therefor. In particular the invention is directed to the continuous analysis of water for dissolved oxygen.

Due to the corrosive properties of dissolved oxygen in water used in steam generators, because of the high temperatures involved, it is highly desirable to be able to determine the concentration of oxygen in the feedwater even when present in exceedingly minute amounts. Also it is necessary, from a practical standpoint, to make the determination easily and quickly, and a continuous analysis system is preferred.

Several methods of such continuous analysis have been proposed, and one of the best involves the determination of dissolved oxygen by colorimetric means. For example the water is passed in series through two color absorption tubes of identical size, the amount of light absorbed being determined by illuminating the cells at one end and observing the transmitted light by means of a pair of photocells, or other light responsive elements at the other end. As the water passes from the first cell to the second a mixture of caustic and pyrogallol solutions is added. Due to the oxygen-sensitiveness of the alkaline pyrogallol and the coloring properties of the oxidized product, the light absorbed in the second cell will exceed that absorbed in the first cell in accordance with the concentration of dissolved oxygen in the water.

As heretofore proposed, the above method has had several disadvantages which have limited its commercial use. For one thing the oxygen concentrations being measured are so small (0.1 to 0.0001% by volume) that accurate colorimetric measurement is imperative. This involves accurate calibration of the apparatus employed and reproducible results.

This invention provides an improved apparatus for conducting the above described analyses quickly and accurately. The apparatus is easily calibrated by a special method herein disclosed and the calibration checked whenever desired. The invention also provides specially designed absorption cells for continuous fluid flow, an electrolysis cell for calibration, and metering pumps particularly designed for handling the reagents involved. In addition to oxygen determination, the apparatus is equally suited to the continuous determination of other substances by colorimetric means. For example, iron may be colorimetrically determined by means of the thiocyanate, and pH can be determined by indicators.

The method and apparatus of this invention are described in connection with oxygen determination, with reference to the accompanying drawing in which:

Fig. 1 is a schematic diagram showing the flow of water and reagents through the apparatus and the relative placement of parts and their functions;

Fig. 2 is a detailed view of the absorption cells 15 and 33 of Fig. 1, shown in cross section;

Fig. 3 is a detailed cross sectional view of the electrolysis cell 24 of Fig. 1; and Fig. 4 is a detailed view of the pumps 22 and 30 of Fig. 1.

Referring to Fig. 1, the water to be analyzed is admitted to the apparatus through an inlet valve 10 and passes through a second valve 11 into a flowmeter 12. Between the valves 10 and 11 is a standard overflow standpipe 13 which is open at the upper end. By means of the valve 11 and the reading of the flowmeter 12 the flow of water through the apparatus is adjusted to the desired rate. From the flowmeter 12 the water passes through a conduit 14 to an absorption cell 15 having glass ends. In the absorption cell 15 the color or light transmittance of the water is measured to provide a zero setting or datum line for subsequent analysis measurements, all as described further on. From the cell 15 the water passes through a conduit 16 into a mixing coil 17 which is made of capillary tubing (the sharp bends providing turbulent flow) simultaneously with a metered amount of potassium hydroxide, or caustic, solution from a conduit 18 which joins the conduit 16.

The potassium hydroxide solution is stored in a reservoir 19 from which it is supplied through a conduit 20 and shut off valve 21 to a metering pump 22, the discharge of which is connected to the conduit 18. A drain valve 23 is connected to the conduit 20 for cleaning purposes.

In the mixing coil 17 the water and potassium hydroxide solution are thoroughly mixed and then are passed through an electrolysis cell 24 (not used during analysis) into a second mixing coil 25 similar in construction to the capillary coil 17. In the mixing coil 25 the water and potassium hydroxide are mixed with a specially prepared solution of pyrogallol from a conduit 26 which joins the mixing coil 25.

The pyrogallol solution is stored in a reservoir 27 from which it flows through a conduit 28 and shut-off valve 29 to a metering pump 30, the discharge of which is connected to the conduit 26.

A drain valve 31 is connected to the conduit 28 for cleaning purposes.

In the mixing coil 25 the pyrogallol is brought into intimate contact with the entire sample of water being analyzed, under alkaline conditions, and is oxidized by all dissolved oxygen in the water. As the oxidation product is very dark in color the mixture passing from the mixing coil 25 has acquired a darker shade, the intensity of which depends on the concentration of dissolved oxygen in the water being analyzed. From the mixing coil 25 the darkened mixture passes into a ballast tank 32 to smooth out the flow and then, via a conduit 34, into a second absorption cell 33 which is identical in construction to the cell 15. From the absorption cell 33 the liquid passes out of the apparatus through a drain conduit 35.

Since the treated water continuously passing through the cell 33 is darker than the untreated water passing through the cell 15 in relation to the concentration of dissolved oxygen in the water, a colorimetric comparison of the liquids in the cells 15 and 33 will indicate the percent oxygen in the water. This is done by photoelectric means.

A source of light 36, supplied by a constant wattage transformer 37 to minimize the effect of voltage fluctuations, is mounted on a swivel 38 so that it may be positioned at the end of either of the absorption cells 15 and 33 to direct a steady beam of light therethrough. The source of light 36 may be of any type, one very satisfactory arrangement being an automobile headlight, condensing lenses to form a beam and an iris diaphragm 39 to control the intensity of the beam. At the other ends of the absorption cells 15 and 33 a photoelectric cell 40 is mounted on a swivel 41 which is connected to the swivel 38 by means of a rod 42 so that movement of the rod or either swivel simultaneously positions the source of light 36 and the photocell 40 at the ends of the same absorption cell. In this way either cell may be quickly examined by the photocell 40 under comparative conditions. The photocell 40 may be either the high vacuum type which changes resistance with incident light or it may be the photovoltaic type. In Fig. 1 the photocell 40 is of the latter kind, so that the reading is obtained by a microammeter 43 connected in series therewith. In order that the photocell may cover a practical range it is desirable to filter out the end portions of the spectrum, and for this purpose a filter 44 is positioned in front of the photocell 40 and is mounted on it.

In order to operate the apparatus it is necessary to calibrate it against water having known oxygen concentrations. This is done by admitting oxygen-free water into the inlet valve 10 and passing it through the apparatus with the reagents as described. The water used for the calibration may be freed of oxygen by distillation and de-aeration in conventional manner. The water should be checked for presence of oxygen by means of a Winkler analysis, so that if there is any residual trace it may be taken into account in the calibration. After establishing uniform flow of the oxygen-free water through the apparatus at the rate of flow desired the light source is turned on and the light adjusted to give a maximum reading on the meter 43 when the photocell is receiving the light through the cell 15. Then the cell 33 is examined and the difference in reading between the two cells noted. The reading for the cell 33 will be less than that of the cell 15 due to light absorption by the pyrogallol, which depends on the residual oxygen in the water, and the difference in readings is the first point on the calibration curve, as the residual oxygen, if any, is known from the Winkler analysis.

Succeeding points on the calibration curve are obtained by introducing various known amounts of oxygen continuously into the water. This is accomplished by the electrolysis cell 24. By passing a current of known magnitude through the cell the rate of evolution of oxygen at the anode is determined, and as the rate of flow of liquid through the cell is known from the reading of the flowmeter 12 and the speeds of the pumps 22 and 30 are constant for all analyses, the oxygen concentration in the water leaving the cell 24 is known. Thus any desired number of check points may be obtained and a calibration curve of the apparatus drawn. Since the oxygen concentrations measured are extremely small, usually a fraction of a percent, there is no gaseous evolution in the cell 24, as the gases are immediately dissolved in the solution. The presence of dissolved hydrogen from the cathode has no effect on the accuracy of the apparatus.

In Fig. 2, a detailed cross section of the absorption cells 15 and 33 is shown. Although the particular construction of the cell is not critical, the design shown is simple and has proven satisfactory. A barrel 50, which in this case was a brass tube about 5½ inches long and about ⅝ inch diameter, is threaded on the ends to receive correspondingly threaded bushings 51 and 52 which hold in place glass windows 53 and 54. The glass windows 53 and 54 are of the standard type used in saccharimeters and the like, and they are placed directly in contact with the ground ends of the barrel 50. Rubber gaskets 55 and 56 are used between the glass windows 53 and 54 and the bushings 51 and 52, respectively, to insure uniform pressure on the glass and leakproof joints. Near each end of the barrel 50 are inserted outlet and inlet tubes 57 and 58, which in this cell were ¼ inch copper tubing soldered to the barrel 50. The inlet tube 58 projects slightly into the barrel 50 and is closed at its end 59, there being provided an opening 60 for passage of solution. The opening 60 constituted a $\frac{1}{16}$ inch slit extending about one-third of the tube's circumference and positioned to face toward the opposite end of the barrel 50. The opening 60 was provided because it was found desirable to direct the stream of solution away from the window 54 so that any sediment in the solution would either settle out in the center of the barrel 50 or be swept away, thus reducing the frequency with which the windows must be cleaned.

In Fig. 3, a detailed cross section of the electrolysis cell 24 is shown. Obviously any kind of electroylsis cell may be used, provided the electrodes and container will not react with the alkaline solution passing through. However, the design shown is simple and inexpensive to construct, and is completely satisfactory. A container or cell body 70 is made of glass, and in the cell shown the body 70 was blown from Pyrex glass tubing. The body 70 which is about 1.6 cm. in diameter, is provided with an inlet 71 about 0.6 cm. in diameter and an outlet 72 about 0.7 cm. in diameter. A center portion 73 of the body 70 rises in the center to provide support for an anode 74 which is made of platinum foil cemented to the portion 73. Oppositely disposed to the anode 74 is a cathode 75, also of platinum foil and cemented to the wall of the body 70.

In order to strengthen the body 70 the center portion 73 is filled with a resinous cement 76 which also serves as a support for conductors 77 and 78 imbedded therein. Thin platinum leads 79 and 80 are sealed through the body 70 and connect the anode 74 and cathode 75 with the conductors 77 and 78, respectively.

A fundamental problem in the design and operation of an apparatus of the type herein disclosed is that of delivering the concentrated, rather corrosive reagents at a constant rate within a minimum of space and equipment. A positive displacement pump is necessary for this purpose because the accuracy of the continuous analysis depends in large part on the metering of the reagents. A carefully machined gear pump may be satisfactorily used if it can be made of corrosion resistant materials. Due to the extremely corrosive nature of potassium hydroxide and pyrogallol it was found desirable to provide pumps of simple construction whose parts coming in contact with reagent could be easily replaced. To this end a pump was designed which has no individual valves or ball check parts, but operates on the principle of a rotating notched piston which displaces a volume of the reagent solution by reciprocating motion, the notch, acting as the valve, rotating into a position opening the intake port on the start of the intake stroke and then into a position opening the discharge port and closing the intake port on the return stroke. The pump is shown in detail in Fig. 4.

Referring to Fig. 4, the complete pump comprises a housing A, driving means B, reciprocating means C and pump head D.

The pump head D comprises a casing 100 machined to fit snugly in the end of the housing A. In order to prevent slippage of the casing 100, a set screw 101 is provided which locks the casing 100 in the pump housing A. A piston 102 passes through the center of the casing 100 and into a pump chamber 103. In order to provide an easily replaceable or interchangeable pump cylinder the casing 100 is bored to a larger diameter than the piston 102, at the end surrounding the chamber 103, and a cylinder 104 is snugly fitted therein. The exposed end of the cylinder 104 is closed by a screw plug 105 the end of which is machined to fit the cylinder wall to minimize leakage. In addition a gasket 106 is provided between the plug 105 and the cylinder 104. The casing 100 also contains two oppositely disposed bores 107 and 108 at right angles to the cylinder 104 and extending from the outside through the casing, and through corresponding holes in the cylinder wall, into the chamber 103. As shown, the bores 107 and 108 are the intake and exhaust ports of the pump, respectively. Also in the casing 100 a packing gland 109 is provided around the piston 102 to prevent leakage. The piston 102 contains a groove or flat section 110 extending across about one third of the circumference of the piston and long enough to appear before the bore 107 on the intake stroke and (by rotation of the piston 102) to appear before the bore 108 on the discharge stroke. In this way the piston performs the dual function of pumping the liquid and acting as intake and discharge valves.

The driving means B constitutes a worm gear 111 which is driven by any standard means, such as an electric motor, and a gear 112 meshing with the worm gear 111. Since the pump normally operates at about sixty strokes per minute it is necessary to employ a large speed reduction in the gears 111 and 112, say 30.1, if the usual high speed electric motor is employed to run the pump. The gear 112 is slidably mounted on a shaft 113 but adapted to turn the shaft 113 by means of a spline 114, part of the gear 113 is seated in ball bearing 115 mounted in a casing 116, which supports the moving parts and takes up the thrust due to reciprocation of the pump. The shaft 113 is coupled to the piston 102 by means of a joint 117. Also mounted in the casing 116 is a packing gland 118 around the shaft 113 to prevent oil leakage.

The reciprocating means C comprises a cam 119, a spring 120 and a cam adjustment gear 121. The cam 119 is rigidly mounted on the shaft 113 so that it turns therewith. A stationary member 122, which is mounted in the gear 121 and locked by a set screw 123, engages the cam 119 in an oblique plane so that, as the cam 119 rotates it is alternately moved away from and toward the member 122. In order to take up the lateral thrust of the cam 119 the shaft 113 extends through the member 122 in which it moves freely. The cam 119 will always remain in contact with the member 122 by virtue of the compression spring 120, thus reciprocating the shaft 113 one complete stroke (i. e., forward and back again) for each revolution.

It is obvious that the rotation of the piston 102 and its reciprocation must be in a certain phase relationship in order for the section 110 to face the bores 107 and 108 at the proper parts of the stroke, and in fact the capacity of the pump may be varied, within limits, by changing this phase relationship. This adjustment is the purpose of the gear 121. The gear 121 meshes with a worm gear 124 mounted on a common shaft with a knob 125, so that by turning the knob 125 the gear 121, and thus the member 122, rotate to any desired position. In this way the phase relationship between the rotation and reciprocation of the piston 102 may be altered or adjusted as desired. In order to hold the gear 121 in place and to take up the reaction of the spring 120 and the cam 119 a channel 126 which is fastened to the housing A passes across the back of the gear 121. In the channel 126 a screw knob 127 is mounted so as to bear against the gear 121 for fine adjustment and to lock it against movement by accidental rotation of the knob 125. Proper lubrication of the pump is assured by placing oil in that part of the housing A which surrounds the driving and reciprocating means B and C, and for this purpose an oil hole and plug 128 are provided.

An advantage of the pump described is that the parts most affected by the solution being pumped are extremely simple and few, and they may be easily replaced, or made of expensive materials at a minimum of cost. The chief location of corrosion has been the cylinder wall 104 and the piston. However, the effect of the solutions is slight if the cylinder and piston in the potassium hydroxide pump are made of Monel metal and in the pyrogallol pump of Durimet alloy (a chrome-nickel steel containing also molybdenum, silicon and copper). As an alternative the Durimet alloy may be replaced by 18—8 molybdenum steel.

As already indicated, the pump was designed to operate at about sixty strokes per minute, and at this speed the maximum capacity is about 0.6 cc. per minute.

In the apparatus described many variations are obvious. For example the mixing coils 17 and 25 may be replaced by any type of device which will accomplish effective mixing of the solutions. The need of a ballast tank 32 will depend on size and placement of parts, but in a compact layout it is desirable.

Where the apparatus is used for the continuous analysis of other materials in the water, requiring the addition of only one reagent, one pump and the electrolysis cell 24 are not used. Other variations will be apparent to those skilled in the art, and the invention should not be limited other than as defined by the appended claims.

The invention described herein may be manufactured and used by or for the Government of the United States of America for governmental purposes without the payment of any royalties thereon or therefor.

We claim:

Photometric apparatus for the continuous determination of dissolved oxygen in water and for calibrating its indications which comprises a first and second light absorption cell, means for fixing a predetermined flow of water to said first cell, an outlet conduit means from said first cell, including successively an inlet branch conduit, a mixing portion arranged to provide turbulent flow therein, an electrolyzing cell, a second inlet conduit, a second mixing portion to provide turbulent flow, an expanded portion to arrest turbulence, said outlet conduit then entering said second light absorption cell, light measuring means, including a light source and light responsive element, said light measuring means being mounted on a movable support and said cells being so positioned that said light measuring means can be shifted successively in light measuring arrangement with either of said cells, and an outlet from said second cell.

RICHARD L. TUVE.
JOSEPH C. WHITE.
ELMER L. LUKE.

REFERENCES CITED

The following references are of record in the file of this patent:

UNITED STATES PATENTS

| Number | Name | Date |
| --- | --- | --- |
| 820,113 | Hinkson | May 8, 1906 |
| 1,020,001 | Van Pelt | Mar. 12, 1912 |
| 1,159,699 | Murdock | Nov. 9, 1915 |
| 1,744,791 | Nemetz | Jan. 28, 1930 |
| 1,807,821 | Behr | June 2, 1931 |
| 1,919,858 | Pettingill | July 22, 1933 |
| 1,951,035 | Parker | Mar. 13, 1934 |
| 1,954,925 | Exton | Apr. 17, 1934 |
| 1,960,615 | Baker | May 29, 1934 |
| 1,967,428 | Quereau | July 24, 1934 |
| 1,993,759 | Stockmeyer | May 12, 1935 |
| 2,007,871 | Oldham | July 9, 1935 |
| 2,114,234 | Ornstein et al. | Apr. 12, 1938 |
| 2,118,837 | Felton | May 31, 1938 |
| 2,122,363 | Christie | June 28, 1938 |
| 2,238,903 | Lieneweg | Apr. 22, 1941 |
| 2,305,108 | Rowe | Dec. 15, 1942 |

OTHER REFERENCES

Journal of Chemical Physics, June 1934, vol. 2, pp. 342–344.

Chemical & Metallurgical Engineering, July 1928, pp. 421–423.